(12) United States Patent
Landolsi

(10) Patent No.: US 6,570,842 B1
(45) Date of Patent: May 27, 2003

(54) SYSTEM AND APPARATUS FOR DESIGNING AND PRODUCING SIGNALLING WAVEFORMS FOR DIRECT-SEQUENCE CODE DIVISION MULTIPLE ACCESS COMMUNICATIONS

(75) Inventor: Mohamed A. Landolsi, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/218,412

(22) Filed: Dec. 22, 1998

(51) Int. Cl.$^7$ .......................... H04J 11/00; H04B 1/713
(52) U.S. Cl. ........................................ 370/210; 375/140
(58) Field of Search .................... 370/203–210, 370/335, 342; 375/130, 140, 146, 261; 708/300, 400, 403, 404, 314–315

(56) References Cited

U.S. PATENT DOCUMENTS

| | | | | |
|---|---|---|---|---|
| 4,730,344 A | * | 3/1988 | Saha | 370/206 |
| 5,377,226 A | * | 12/1994 | Davis | 370/342 |
| 5,509,033 A | * | 4/1996 | Chen | 708/315 |
| 5,914,987 A | * | 6/1999 | Fogel | 708/314 |
| 5,960,029 A | * | 9/1999 | Kim et al. | 370/209 |

OTHER PUBLICATIONS

Mohamed Adnen Landolsi, "Performance of DS–CDMA Communication Systems With Generalized Offset QPSK Modulation", 1986, a whole dissertation.
Andrew J. Viterbi, "CDMA—Principles of Spread Spectrum Communication", Addison–Wesley Publishing Company, pp. 11–75.

* cited by examiner

*Primary Examiner*—Steven Nguyen

(57) ABSTRACT

A method of identifying direct sequence CDMA pulse shapes which optimize a cost function subject to various constraints. The cost function may either be an acquisition SNR or an interference power. The method may be applied to both full-response pulse shapes and partial-response pulse shapes. The constraints include a quasi-constant envelope constraint, a continuous phase constraint, a spectral nulls constraint, and an ISI-free constraint. The Fourier transform of a desired pulse shape is expressed in terms of a finite sum of prolate spheroidal wave functions. The cost function and the constraints are also expressed in terms of this finite sum. Numerical methods software determines the optimal solution. This may be used to produce finite impulse response filters which generate the desired pulse shape.

16 Claims, 4 Drawing Sheets

SYSTEM AND APPARATUS FOR DESIGNING AND PRODUCING SIGNALLING WAVEFORMS FOR DIRECT-SEQUENCE CODE DIVISION MULTIPLE ACCESS COMMUNICATIONS

FIELD OF THE INVENTION

This invention relates to a system and apparatus for designing signalling waveforms for Direct-Sequence Code Division Multiple Access Communications (DS-CDMA), and to systems and methods employing or producing such optimal signalling waveforms.

BACKGROUND OF THE INVENTION

CDMA based wireless communications methods and systems have been introduced and continue to be utilized in digital cellular and PCS (personal communications system) network applications. While much effort at optimizing various aspects of CDMA has been expended, and much of this optimization has been codified in various existing and proposed standards, it is a fact that the current systems use conventional waveform shapes which are not optimized. Waveform shaping is one of the last processes performed in a CDMA transmitter whereby each information element to be transmitted is mapped onto a physical waveform shape.

There has been previous work on the optimization of the chip waveform in DS-CDMA systems. See for example "Performance of DS-CDMA Communication Systems With Generalized Offset QPSK Modulation" by Mohamed Adnen Landolsi, A dissertation submitted in partial fulfilment of the requirements for the degree of Doctor of Philosophy (Electrical Engineering: Systems), 1996, The University of Michigan. This work has not taken into account synchronization acquisition and tracking performance. It has been limited in its application to only full-response pulse shapes, not handling the more general case of partial-response pulse shapes.

SUMMARY OF THE INVENTION

A system and method are provided for improving DS-CDMA system performance through the careful design of the signalling waveforms.

The improved signalling waveforms provided will optimize a cost function, either by minimizing the multiple-access interference power or by maximizing the acquisition SNR, in either case subject to various constraints on the transmitted signals. The immediate impact of this minimization is an increased system capacity (as measured by the number of simultaneous active users) at a given Grade of Service (GoS) determined by the Bit Error Rate (BER), or equivalently, an improved GoS (i.e., lower BER) achieved for a given fixed number of users.

The invention is pertinent to the electrical signalling formats at the physical layer, and does not involve any upper layer protocol changes. Hence, the optimization proposed is transparent to the network architecture, and will only require some modification at the modem level while keeping consistency with higher layers, which greatly facilitates its incorporation in deployed or soon-to-be deployed systems.

To determine a pulse shape having a Fourier transform for use in a DS-CDMA (direct sequence code division multiple access) communications system, the Fourier transform is first projected onto a truncated set of basis functions $f_i(\omega)$, thus expressing the Fourier transform as a sum of M+1 terms of the form $x_i f_i(\omega)$, where the $x_i$ are unknown coefficients, M being an integer selected to result in a sufficiently accurate approximation. Next, a cost function which is either an acquisition SNR or an interference power is expressed as a function of the set of basis functions and the unknown coefficients. The remaining one of the acquisition SNR and interference power is used to express a first constraint in terms of the set of basis functions and the unknown coefficients. The unknown coefficients are numerically solved using mathematical methods software such that the cost function is optimized subject to the first constraint. In some cases, it may be useful to form the Fourier transform by adding up the functions using the solved coefficients. In other cases, the Fourier transform may be used directly to produce filters having the required frequency response.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

The invention provides a method for designing improved direct-sequence CDMA pulse shapes. The following description begins with an introduction to the basic CDMA transmitter and receiver thereby defining terms for use in the subsequent description. This is followed by an identification and discussion of each of the steps in designing the improved CDMA pulse shapes. By way of overview the steps are firstly to identify a cost function to be optimized subject to a series of identified constraints; secondly to project the Fourier transform of the pulse shape to be identified onto a suitable truncated set of basis functions having unknown coefficients, in the illustrated example these functions being prolate spheroidal wave functions; thirdly to convert the series of constraints and cost functions into basis function expressions including the unknown coefficients; fourthly to numerically solve the unknown coefficients and hence for the unknown Fourier transform of the pulse shape; fifthly to compute the inverse Fourier transform to determine the pulse shape and to build a FIR filter on the basis of that, or alternatively to build a filter on the basis of the Fourier transform directly.

Transmitter and Receiver Description

Figure 1:
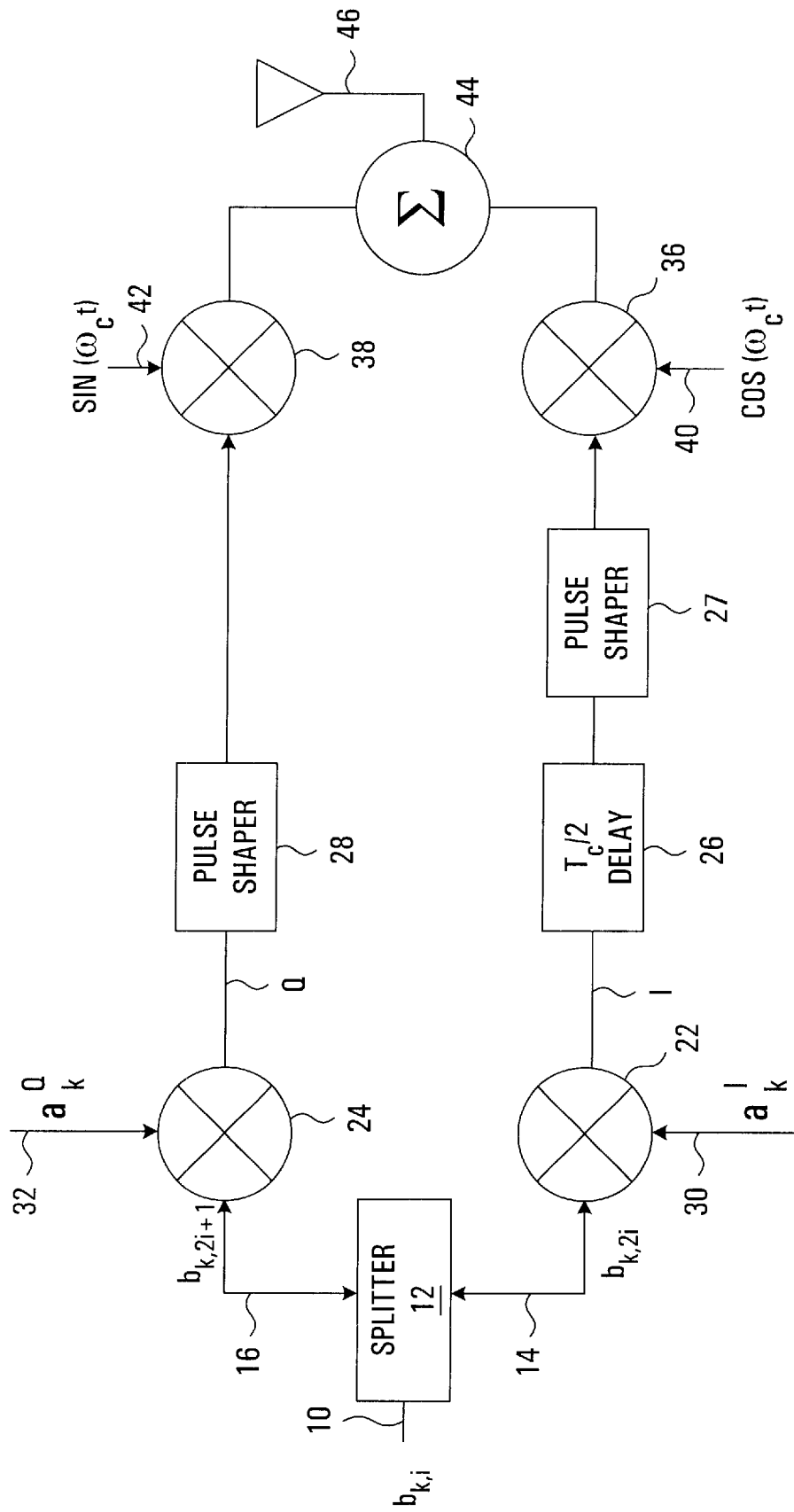
FIG. 1 is a simplified block diagram of a direct sequence CDMA transmitter.
Figure 2:
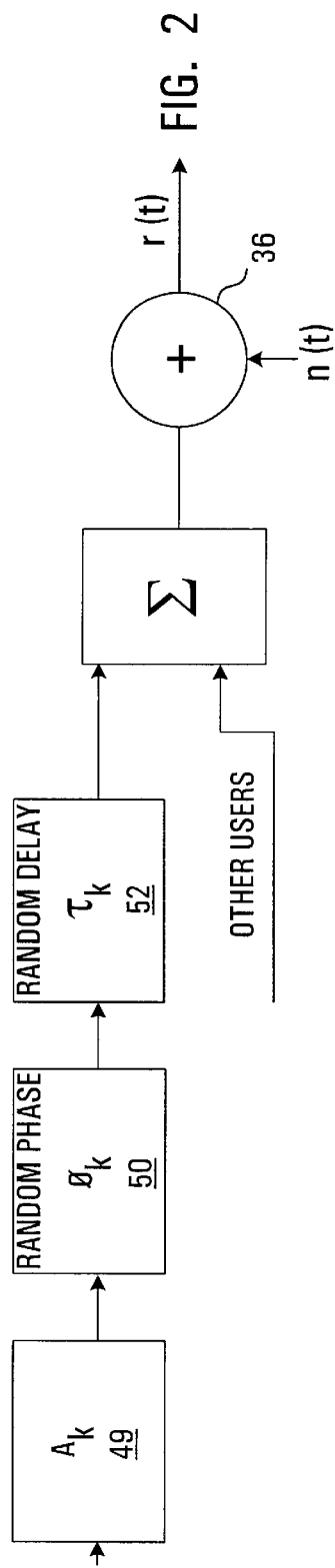
FIG. 2 is a simplified block diagram of an air interface model.
Figure 3:
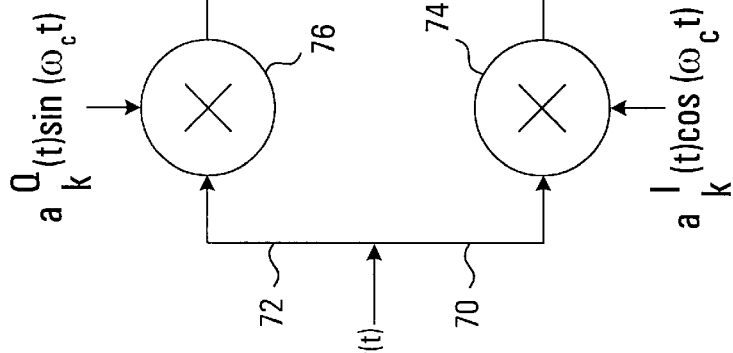
FIG. 3 is a simplified block diagram of a direct sequence CDMA receiver.

A direct sequence CDMA transmitter model block diagram is shown in FIG. 1 and a direct sequence CDMA receiver model block diagram is shown in FIG. 3. A block diagram of the air interface is shown in FIG. 2. For the purpose of example, it will be assumed that a modulation format consisting of the generalized offset quadrature type is used. The data bits from all transmitters are modelled as sequences of independent binary random variables taking ±1 values with equal probability (a bit 0 is mapped into −1 and a bit 1 is mapped into +1). The transmitter model assumes there are K users, but the details for only one user, namely the $k^{th}$ user, are shown. The bit stream $b_{k,i}$ 10 of the $i^{th}$ user is split with splitter 12 into two branches 14, 16 containing of the even and odd numbered bits with branch 14 containing a stream consisting of the even bits $b_{k,2i}$ and branch 16 containing a stream consisting of odd bits $b_{k,2i+1}$. These bit streams will be referred to as the I and Q bit streams for the kth user respectively. Every bit has a duration of T seconds. Using multipliers 22, 24 these are multiplied by respective random independent spreading sequences $a^I_k$, $a^Q_k$ 30, 32. Each spreading sequence 30, 32 is composed of a respective pseudo random sequence of chips having values of ±1. The I channel is subject to a delay of $T_c/2$ by delay element 26. The resulting sequences are fed through pulse shapers 27, 28 which have an impulse response of $\psi(t)$ and frequency response $\Psi(f)$. These may be FIR (Finite Impulse Response) filters for example. The spreading sequences 30, 32 have a rate N times faster than the data bit rate, i.e., there are N chips/bit. Equivalently, the chip interval $T_c$ is equal to T/N. If the chip pulse duration $T_p$ is also equal to $T/N=T_c$ then the pulse shape is a full-response pulse limited to one chip interval. If $T_p>T_c$ then the pulse is a partial-response pulse. For partial response, $T_p=N_cT_c$ where $N_c$ is an integer in order for the below-described ISI-free constraint to be realizable.

It is assumed that the chip waveform is normalized such that the following equation is satisfied:

$$\int_{-\infty}^{\infty} \psi^2(t)dt = 1.$$

More generally, it is assumed that the received energy per chip, from any user, is a fixed constant. This has been set to one for simplicity. In other words, perfect power control is assumed. In addition, it is assumed that $\psi(t)$ is symmetric about $T_c/2$, which is usually true for data shaping pulses for practical applications. Other than this, $\psi(t)$ has an arbitrary shape.

The spreading sequences of the in-phase (I) and quadrature (Q) branches multiplied by the appropriate time shifted pulse shape, are referred to as the spreading signals and can both be expressed generally by:

$$a(t) = \sum_j a_j \psi(t - jT_c).$$

Using a pair of mixers 36, 38 for each user, the two branches of data thus obtained are mixed onto two RF carriers 40, 42 at the same frequency $f_c$ but in phase quadrature. The I stream modulates the in-phase cosine carrier $\cos(2\pi f_c t)$ 40, and the Q stream modulates the quadrature sine carrier $\sin(2\pi f_c t)$ 42. The in-phase and quadrature components are then added with an adder 44 and fed to the transmitting antenna 46. For illustration, the transmitted signal from any given user (with index k where $1 \leq k \leq K$, and K is the total number of users) has the following expression:

$$s_k(t) = \sum_i b_{k,2i} a^I_k\left(t - \frac{T_c}{2}\right)\cos(2\pi f_c t) + b_{k,2i+1} a^Q_k(t)\sin(2\pi f_c t).$$

This model of the spreading codes is different from other commonly used ones in the following sense. Unlike the case where the spreading codes are periodic and deterministic, it is assumed that the sequences ($a_j$) of data chips are random and non-periodic. In practice, such a model adequately approximates a maximum-length pseudo-random sequence generated by a shift register with a very large number of stages (say L), and hence with repetition period $2^L-1$, which grows exponentially with L. Therefore, within a bit interval, the block of N code chips used for spreading looks sufficiently random and a periodic provided that N is much smaller than $2^L-1$, which can be easily the case.

The air interface model is shown in FIG. 2. Each signal undergoes an attenuation represented by $A_k$ 49. Because there is no synchronization between users, the RF carriers of the different transmitters, though at the same frequency, have random independent phases $\phi_k$ 50 where each phase can take random values uniformly distributed over the interval $[0, 2\pi]$. Moreover, it is assumed that the transmitted signals undergo independent random delay denoted $\tau_k$ 52, before they reach the receiver. Over the air interface the user's transmitted signals are added together and furthermore there is additive thermal noise which can be modelled as a white Gaussian process n(t) with power spectral density $N_o/2$. The resulting signal at the receiver antenna is the sum of all the delayed and attenuated transmitted signals plus the thermal noise component n(t). This is expressed as:

$$r(t) = \sum_{k=1}^{K} A_k s_k(t - \tau_k) + n(t)$$

where $A_k$ is the k-th signal received amplitude and $\tau_k$ its corresponding delay, which is assumed to be uniformly distributed anywhere in the interval [0, T].

The receiver has to decode a particular signal among all these. The receiver uses a coherent correlation integrator followed by a sampler synchronized to the bit timing of the desired transmitter. This is a well-known receiver structure widely documented in the literature. See for example M. B. Pursley, "Spread-spectrum multiple-access communications", in Multi-User Communications, G. Longo (ed.), Springler-Verlad, Vienna, 1980. or F. D. Garber and M. B. Pursley, "Performance of offset quadriphase spread-spectrum multiple-access communications", IEEE Trans. Commun., vol. COM-29, pp.305–313, March 1981.

FIG. 3 illustrates a receiver block diagram for the k-th signal. The received signal r(t) is processed by I and Q receive channels where 70, 72 where it is multiplied by the I and Q spreading signals $a^I_k(t)$ cos $(2\pi f_c t)$ and $a^Q_k(t)$sin $(2\pi f_c t)$ respectively by multipliers 74, 76. The resulting products are integrated from t−T to t by correlator integrators 78, 80, the outputs of which are sampled by samplers 82, 84 at times t=(i+1)T. The sampled signals passed to decision blocks 86, 88. The receiver is able to acquire the phase of the carrier, the channel delay, and the bit and chip timings of the transmitted signal. Furthermore through the use of known power control systems (not shown) all active signals from the different users arrive at the receiver with substantially equal power, i.e., all $A_k$'s are substantially equal to a constant A.

For illustration, the output of the correlating integrator used for the quadrature Q-branch of the k-th signal, sampled at the end of the first bit interval is given below. Since ±1 data are equally likely, it is assumed without loss of generality that a +1 data symbol was transmitted and the receiver performance is assessed based on that. The decision variable Z which results may be expressed as:

$$Z = \int_{\tau_k}^{T+\tau_k} r(t)a_k^Q(t-\tau_k)\sin[2\pi f_c(t-\tau_k)+\phi_k].$$

The decision blocks 86, 88 perform zero-threshold comparison and decode a +1 if the decision variable Z is positive and −1 if it is negative. In the absence of noise and interference, the decision variable Z is positive and the receiver will decide +1, but in reality Z is corrupted by noise and interference and may become negative, which will cause the receiver to decide −1 and hence make an error.

It is noted that the assumptions described above for the system model are widely accepted for DS-CDMA systems, and do not form a special unrealistic case. These assumptions will not be elaborated upon any further since ample documentation can be found in the published literature.

There are however additional features which are not included, such as interference from neighbouring cells, multipath fading effects, and band-limiting at the transmitter either.

Optimization Method

In what follows a shifted version $h(t)$ of $\psi(t)$ defined by $h(t)=\psi(t+T_c/2)$ will be used in some circumstances for mathematical simplification. Hence, $h(t)$ and its Fourier transform $H(f)=\Psi(f)e^{j\pi f T_c}$ are both real functions with even symmetry about zero.

The optimization method provided by an embodiment of the invention identifies a suitable $\psi(t)$ subject to constraints and cost functions. The method may be summarized as follows:

Step 1. Identify a cost function to be optimized subject to a series of identified constraints;

Step 2. Project H(F) onto a suitable truncated set of basis functions having unknown coefficients;

Step 3. Convert the series of constraints and cost functions into basis function expressions including the unknown coefficients;

Step 4. Numerically solve the unknown coefficients and hence H(f);

Step 5. Compute Inverse Fourier transform of H(f) to the h(t) and thus $\psi(t)$ or build filter using H(f) directly;

The above identified steps will now each be described in detail.

Step 1. Identify a Cost Function to be Optimized Subject to a Series of Identified Constraints.

The following is a summary of some relevant design parameters which will be used in defining the cost functions and constraints described below:

$T_c$: chip interval duration (could be normalized to 1).

$T_p$: pulse shape h(t) duration.

$N_c$: number of one-sided chip interval durations of pulse shape h(t). i.e. h(t) is defined over $[-N_c T_c/2, N_c T_c/2]$ or $[-T_p/2, T_p/2]$ W: one-sided in-band power bandwidth i.e. [−W, W] contains a fraction (1−η) of total power.

η: fraction of out-of-band power. Typically set to 0.01 to constrain 99% of the pulse shape's power to the bandwidth W.

$K_u$: number of interfering users. Total number of users is $1+K_u$.

N: number of chips per bit (or processing gain).

$W_1, W_2, \ldots W_n$: frequencies at which H(f) must be zero, or less than some $X_{dB}$ value.

$P_D$: acquisition detection probability (typically~90%).

$P_F$: acquisition false alarm probability (typically~10%).

$SNR_a$: acquisition SNR depends on $P_D$, $P_F$ and other factors.

$\mu$: minimum $SNR_a$.

$V_{MAX}$: maximum allowable interference power.

Normalized Energy

Normalized energy is not so much a constraint but an assumption to make the comparison of pulse shapes have a common energy baseline. It is assumed for simplicity that h(t) has normalized energy, which in the frequency domain is equivalent to:

$$\int_{-\infty}^{\infty} H^2(f)df = 1$$

Interference Power

The interference power $V_O$ (power experienced due to other users) can be written as expressed by Andrew J. Viterbi, "Principles of Spread Spectrum Communication, Addison Wesley Longman, Inc., 1995:

$$V_O = \int_{-\infty}^{\infty} H^4(f)df$$

This can either be a cost function which needs to be minimized, or may be expressed as a constraint in the form:

$$V_O = \int_{-\infty}^{\infty} H^4(f)df \leq V_{MAX}$$

Spectral Efficiency

It is desirable to confine the bandwidth of the transmitted signals to the allocated frequency band as much as possible (in order to minimize out-of-band interference). A measure of this confinement is the in-band power bandwidth occupancy W defined such that only a fraction η of the signal power is contained outside the frequency range [−W, W], where η is a very small number, i.e., η<<1.

Using the h(t)/H(f) notation, and assuming that there is normalized total power as defined above, the constraint for in-band power confinement may be written as:

$$\int_{-W}^{W} H^2(f)df = (1-\eta).$$

Phase Continuity

For the above described signalling formats, in the case that full response signalling pulse shapes (i.e. $T_c=T_p$) are to be used, a phase continuity constraint may be included. The phase continuity constraint is not applicable to partial-response pulse shapes. Phase continuity is achieved by having the following conditions satisfied by the pulse shape:

$$h(0)=h(T_c)=0$$

only one equality is sufficient given the pulse symmetry. In terms of H(f), the continuous phase constraint can be specified as:

$$\int_{-\infty}^{\infty} H(f)\cos(\pi f T_c)\,df = 0$$

Envelope Uniformity

Envelope uniformity, or quasi-constant envelope uniformity is another constraint which is only applicable to full response pulse shapes (i.e. $T_c = T_p$). It is not appropriate to apply this constraint to partial response pulse shapes because the envelope at any given time with partial response pulses will be effected by data sent over several past intervals. For full response pulse shapes, the envelope of the transmitted signals is defined as:

$$e(t) = \sqrt{\psi^2(t) + \psi^2(t \pm T_{p/2})}$$

The amount of envelope variation is measured by the Amplitude Modulation (AM) index defined as:

$$\Delta e = \frac{\max(e(t)) - \min(e(t))}{\max(e(t)) + \min(e(t))}$$

It is desirable to force $\Delta e$ to zero in order to minimize the regeneration of spectrum side-lobes by nonlinear amplification at the transmitter. However, a smaller value for de is also tolerable and still gives acceptable performance. A quasi-constant envelope condition may be achieved by having $e(0) = e(T_p/4)$. When the continuous-phase condition holds, this is found to yield:

$$\sqrt{2}\psi(T_c/4) = \psi(T_c/2)$$

This condition has been shown to reduce the peak envelope variation to a small amount, and hence, to reduce the overall envelope fluctuations. See A. J. Vigil, M. A. Belkerdid and D. C. Malocha, "Finite truncated cosine series design of full response signalling offset quadrature binary modulation systems", IEEE Trans. Commun., vol. 42, No. 2/3/4, pp.1465–1470, Feburary/March/April 1994.

Using the h(t)/H(f) notation, this may be expressed as:

$$\int_{-\infty}^{\infty} H(f)\left(1 - \sqrt{2}\cos\left(\pi f \frac{T_c}{2}\right)\right)df = 0$$

ISI-Free Signal Constraint

For partial-response signals, it is desirable that the pulse shape be ISI (inter-symbol interference) free. This constraint is not relevant to full-response signalling.

It is noted that if an ISI-free constraint is not imposed then an additional ISI variance term must be added. This is given by $$V_I = \frac{1}{2}\sum_{n=1}^{N_c}\left[\int_{-\infty}^{\infty}\cos(2\pi f n T_c)H^2(f)\,df\right]^2$$

and the interference term becomes $V_O + V_I$ instead of simply $V_O$.

For the pulse shape to be ISI-free, the following constraint must be satisfied:

$$h(nT_c) = \int_{-\infty}^{\infty}\cos(2\pi n f T_c)H(f)\,df = 0, \quad n = 1, \ldots, N_c$$

Spectral Nulls

A constraint may be imposed consisting of nulls in the response spectrum H(f), or more particularly, a minimum attenuation may be imposed at certain frequencies. These may be evenly spaced or otherwise depending on design requirements. This constraint may be expressed as:

$$H(W_i) = 0, \text{ or } \leq XdB \text{ for fixed } W_1, \ldots W_n$$

Acquisition SNR

To guarantee a fixed probability of detection $P_D$ at a given $P_F$ a worst case "acquisition SNR" $SNR_a$, may be defined which must exceed $\mu$dB. The value for $\mu$dB can be obtained based on the $P_D$ and $P_F$ values, and also on the acquisition scheme. (Reference above identified book authored by Viterbi, chapter 3). For example, $\mu=5$ dB is needed for $P_D=90\%$ and $P_F=10\%$ and with no post-detection integration in an unfaded channel. A constraint on the $SNR_a$ may be expressed as:

$$SNR_a = \frac{N}{K_u}\frac{\left[\int_{-\infty}^{\infty}H^2(f)\cos(2\pi f \tau)\,df\right]^2}{\int_{-\infty}^{\infty}H^4(f)\,df} \geq \mu$$

Alternatively, this can be used as a cost function which can be expressed as follows:

$$\text{maximize } SNR_a = \frac{N}{K_u}\frac{\left[\int_{-\infty}^{\infty}H^2(f)\cos(2\pi f \tau)\,df\right]^2}{\int_{-\infty}^{\infty}H^4(f)\,df}$$

In the above, $\tau$ is a residual timing error related the acquisition chip resolution step size, i.e., the acquisition process tries to acquire the PN code offset by making successive tests of all possible offsets, jumping each time by whatever the step size is (then the tracking process will take over and further refine the synchronization) until this 'coarse' acquisition is achieved. Typically, that is in many practical schemes, this step size is equal to $T_c$ (the chip duration), in which case a worst case for $\tau$ would be $T_c/2$. Since the "worst case" $SNR_a$ is obtained for $\tau = T_c/2$, the term $\cos(2\pi f \tau)$ can be changed to $\cos(\pi f T_c)$. Alternatively, $\tau$ can be left as a parameter.

Step 2. Project H(F) Onto a Suitable Truncated Set of Basis Functions Using Unknown Coefficients;

The next step in the solution is to project H(f) into a finite-dimensional discrete formulation obtained from the projection of H(f) onto a properly chosen set of basis functions. The coefficients resulting from this expansion form a vector with a finite number of unknown components to be solved for.

The basis functions to be used in the preferred embodiment are known as prolate spheroidal wave functions denoted by $\phi_i(f), i=0, 1, \ldots,$. These are described in detail in D. Slepian and H. Pollak, "Prolate spheroidal wave functions, Fourier analysis and uncertainty-I", Bell System Technical Journal, 40, No. 1 (January 1961), pp.43–64, and C. Flammer, Spheroidal Wave Functions, Stanford University Press, Stanford, Calif., 1957.

A given set of prolate spheroidal wave functions $\phi_i(f)$ is determined by parameter $T_p$ and W such that the set is complete and orthonormal over the space of finite-energy functions time-limited to $[-T_p/2, T_p/2]$. Moreover, an important orthogonality property also holds over the interval $[-W, W]$, expressed by $$\int_{-W}^{W} \phi_i(f)\phi_j(f)\,df = \lambda_i$$

if i=j and zero otherwise, where $\lambda_i$ is strictly positive and represents the eigenvalue associated with the function $\phi_i$. $\lambda_i$ also gives the fraction of energy of $\phi_i$ contained in the band $[-W, W]$.

A series expansion of H(f) using these basis functions may be expressed as:

$$H(f) = \sum_{i=0}^{\infty} x_i \phi_i(f)$$

where the $x_i$'s are the unknown coefficients to be solved for. Once the $x_{i,s}$ are found and having the basis functions readily available, H(f) can be computed and subsequently the optimal h(t) can be determined by an inverse Fourier transform. While the above expression is an infinite series, in practice the number M of terms needed is on the order of $2WT_p$ for sufficient accuracy in approximation, but must also be at least equal to the total number of equations used $N_{eqs}$ (these equations described in detail below). In other words, min M=max $(2WT_p, N_{eqs})$. This is important because it allows for the truncation of the expansion of H(f) to a relatively short linear combination of wave functions with no major loss in accuracy. In addition, the $\phi_i$'s are even for i even and odd for i odd. Therefore, since H(f) is even, only even-indexed prolate spheroidal wave functions need be included in its expansion. Thus the series can be approximated as:

$$H(f) \approx \sum_{m=0}^{M} x_{2m}\phi_{2m}(f)$$

where M+1 is the total number of basis functions used in the approximation, and $x_0, x_2, \ldots, x_{2M}$ are the unknown expansion coefficients to be solved for.

Step 3. Convert the Series of Constraints and Cost Functions into Basis Function Expressions Including the Unknown Coefficients Having expressed the pulse shape in terms of prolate spheroidal wave functions, now the above introduced constraints and cost functions can be similarly approximated in terms of the prolate spheroidal wave functions, and more particularly in terms of the coefficients in $x_i$ appearing in the above expansion for H(f).

The normalized energy assumption/constraint in terms of prolate spheroidal functions translates to:

$$\sum_{m=0}^{M} x_{2m}^2 = 1$$

The interference power cost function or constraint, in terms of the approximation with prolate spheroidal wave functions, may be expressed as:

$$\text{minimize } V_o = \sum_{k_0} \ldots \sum_{k_N} \alpha(k_0, \ldots, k_M)\prod_{m=0}^{M} x_{2m}^{k_m}$$

in the case of its use as a cost function and $$V_O = \sum_{k_0} \ldots \sum_{k_M} \alpha(k_0, \ldots, k_M)\prod_{m=0}^{M} x_{2m}^{k_m} \leq V_{MAX}$$

in the case of its use in a constraint where only terms satisfying $$\sum_{m=0}^{M} k_m = 4, \qquad (4; k_0, k_1, \ldots, k_M) = \frac{4!}{k_0! k_1! \ldots k_M!}$$

are included in the above expressions and where $$\alpha(k_0, k_1, \ldots, k_M) = (4; k_0, k_1, \ldots k_M)\int_{-\infty}^{\infty}\prod_{m=0}^{M}\phi_{2m}^{k_m}(f)\,df$$

and $V_{MAX}$ is the maximum allowable interference power.

The constraint for in-band power confinement translates into the following constraint in terms of the prolate spheroidal wave function coefficients:

$$\sum_{m=0}^{M} \lambda_{2m} x_{2m}^2 = (1-\eta).$$

The constraint for phase continuity translated into the following constraint in terms of the prolate spheroidal wave function coefficients:

$$\sum_{m=0}^{M} \beta_{2m} x_{2m} = 0$$

where:

$$\beta_{2m} = \int_{-\infty}^{\infty} \phi_{2m}(f)\cos(\pi f T_p)\,df$$

The quasi-constant envelope continuity constraint translates into the following for the prolate spheroidal function coefficients:

$$\sum_{m=0}^{M} \gamma_{2m} x_{2m} = 0$$

where $$\gamma_{2m} = \int_{-\infty}^{\infty} \phi_{2m}(f)(1-\cos(\pi f T_p/2))\,df$$

The ISI-free constraint translates into the following constraint for the prolate spheroidal wave function coefficients:

$$\sum_{m=0}^{M} \beta_{2m,n} x_{2m} = 0, \quad n = 0, 1, \ldots N_c$$

where $$\beta_{2m,n} = \int_{-\infty}^{\infty} \cos(2\pi n f T_c) \phi_{2m}(f) \, df$$

In the event that the ISI-free constraint is not imposed, the additional ISI variance term $V_I$ translates into the following in terms of the prolate spheroidal wave functions:

$$V_I = \sum_{n=1}^{N_c} \left[ \int_{-\infty}^{\infty} \cos 2\pi n T_c \left[ \sum_{m=0}^{M} x_{2m} \phi_{2m}(f) \right]^2 df \right]^2$$

$$= \sum_{n=1}^{N_c} \left[ \sum_{m_1=0}^{M} \sum_{m_2=0}^{M} x_{2m_1} x_{2m_2} \zeta_{2m_1 2m_2, n} \right]^2$$

where $\zeta_{2m_1 2m_2, n} = \int_{-\infty}^{\infty} \cos(2\pi f n T_c) \phi_{2m_1}(f) \phi_{2m_2}(f) \, df$ The spectral nulls constraint in terms of prolate spheroidal wave functions may be expressed as:

$$\sum_{m=0}^{M} x_{2m} \phi_{2m}(W_i) = 0 \text{ or } \leq X \text{ dB for } W_1, \ldots, W_n$$

The acquisition $SNR_a$ constraint/cost function can be expressed in terms of prolate spheroidal wave functions as follows:

$$SNR_a = \frac{N}{K_u} \frac{\left[ \int_{-\infty}^{\infty} \left( \sum_{m=0}^{M} x_{2m} \phi_{2m}(f) \right)^2 \cos(2\pi f T_c / 2) \, df \right]^2}{V_o} \leq \mu$$

for the constraint, and $$\text{minimize } SNR_a = \frac{N}{K_u} \frac{\left[ \int_{-\infty}^{\infty} \left( \sum_{m=0}^{M} x_{2m} \phi_{2m}(f) \right)^2 \cos(2\pi f T_c / 2) \, df \right]^2}{V_0}$$

for the cost function. $SNR_a$ in the above expression can also be expressed as:

$$\frac{N}{K_\mu} \frac{\left[ \sum_{m_1=0}^{M} \sum_{m_2=0}^{M} x_{2m_1} x_{2m_2} \xi_{2m_1, 2m_2} \right]^2}{V_0}$$

where $$\xi_{2m_1 2m_2} = \int_{-\infty}^{\infty} \cos(\pi f T_c) \phi_{2m_1}(f) \phi_{2m_2}(f) \, df$$

Step 4. Numerically Solve the Unknown Coefficients and Hence H(f)

There are many permutations of cost functions and constraints which may be considered. A requirement is that one of the two cost functions, namely acquisition $SNR_a$ and interference power, must be included. Furthermore, a constraint must be included relating to the cost function which is not included. Thus, there are two general cases which can be solved. The first results in a solution to the following problem:

"Find the pulse shape function ψ(t) that will maximize the acquisition $SNR_a$ subject to the interference power being less than $V_{MAX}$ over the space of all permissible pulse shapes, subject to some combination of the following constraints, some being only appropriate to full response pulse shapes: normalized energy, in-band power confinement, phase continuity, envelope uniformity, ISI-free signals, and spectral nulls. Mathematically this may be expressed as:

Maximize:

$$SNR_a = \frac{N}{K_\mu} \frac{\left[ \sum_{m_1=0}^{M} \sum_{m_2=0}^{M} x_{2m_1} x_{2m_2} \xi_{2m_1, 2m_2} \right]^2}{V_0}$$

subject to $$V_o = \sum_{k_0} \ldots \sum_{k_M} \alpha(k_0, \ldots, k_M) \prod_{m=0}^{M} x_{2m}^{k_m} \leq V_{MAX}$$

and subject to zero or more of the following additional constraints:

$$\sum_{m=0}^{M} x_{2m}^2 = 1$$

$$\sum_{m=0}^{M} \lambda_{2m} x_{2m}^2 = (1 - \eta)$$

$$\sum_{m=0}^{M} \beta_{2m} x_{2m} = 0$$

$$\sum_{m=0}^{M} \gamma_{2m} x_{2m} = 0$$

$$\sum_{m=0}^{M} \beta_{2m,n} x_{2m} = 0, \quad n = 0, 1, \ldots N_c$$

$$\sum_{m=0}^{M} x_{2m} \phi_{2m}(W_i) = 0 \text{ or } \leq X \text{ dB for } W_1, \ldots, W_n$$

where the terms and parameters are as defined previously. For the non ISI-free case, $V_0 + V_I \leq V_{MAX}$ must be used in the above instead of just $V_0$.

The second results in a solution to the following problem:

"Find the pulse shape function ψ(t) that will minimize the interference power with the acquisition SNR greater than $\mu$ over the space of all permissible pulse shapes, subject to some combination of the following constraints, some being only appropriate to full response pulse shapes: normalized energy, in-band power confinement, phase continuity, envelope continuity, ISI-free signals, and spectral nulls. Mathematically this may be expressed as:

Minimize $$V_o = \sum_{k_0} \cdots \sum_{k_M} \alpha(k_0, \ldots, k_M) \prod_{m=0}^{M} x_{2m}^{k_m}$$

subject to:

$$SNR_a = \frac{N}{K_\mu} \frac{\left[ \sum_{m_1=0}^{M} \sum_{m_2=0}^{M} x_{2m_1} x_{2m_2} \xi_{2m_1,2m_2} \right]^2}{V_0} \geq \mu$$

and subject to zero or more of the following additional constraints:

$$\sum_{m=0}^{M} x_{2m}^2 = 1$$

$$\sum_{m=0}^{M} \lambda_{2m} x_{2m}^2 = (1 - \eta)$$

$$\sum_{m=0}^{M} \beta_{2m} x_{2m} = 0$$

$$\sum_{m=0}^{M} \gamma_{2m} x_{2m} = 0$$

$$\sum_{m=0}^{M} \beta_{2m,n} x_{2m} = 0, \quad n = 0, 1, \ldots N_c$$

$$\sum_{m=0}^{M} x_{2m} \phi_{2m}(W_i) = 0 \text{ or } \leq XdB \text{ for } W_1, \ldots, W_n$$

where the terms and parameters are as defined previously.

Figure 4:
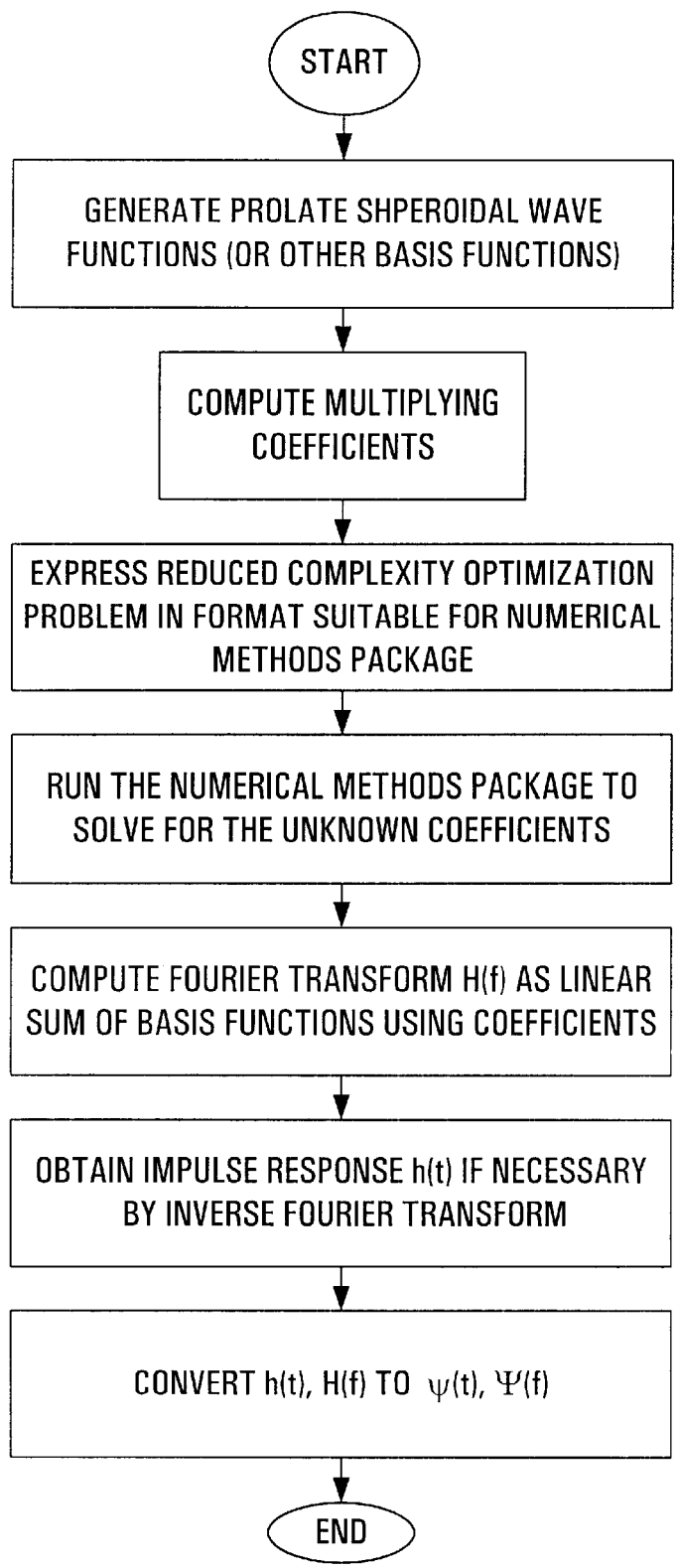
FIG. 4 is a flow chart of a method of designing DS-CDMA pulse shapes according to an embodiment of the invention.

These are finite-dimensional nonlinear constrained optimization problems which may be solved by means of well-known algorithms for example with sequential quadratic programming techniques. The steps taken to determine the optimized solution will be described with reference to the flow chart in FIG. 4.

First, generate (or tabulate) the prolate spheroidal wave functions $\phi_i(f)$ (in freq. domain) using the formulas of a numerical recipes book or the above identified Spheroidal Wave Functions book. This can be done using any high level language (C, Fortran, Matlab, etc).

Second, using numerical integration (many techniques are available compute the multiplying coefficients present in all the equations. These are the coefficients multiplying the unknown expansion variables to be solved for. All the coefficients involve an integral of some power of the spheroidal wave functions $\phi_i(f)$ multiplied by a known function (cos ( ), etc), and can easily be evaluated on a computer to whatever accuracy necessary.

Third, obtain the equivalent reduced-complexity optimization problem formulation (in terms of cost function+ constraints) as expressed by a set of non-linear finite-dimensional equations and convert this to an input format suitable for a numerical methods package.

Fourth, feed this formulation into a numerical methods package for solving non-linear optimization problems and run the program to obtain the $x_i$'s, namely the unknown expansion coefficients. As an example, the Fortran-based package known as VMCON2 which implements sequential quadratic programming can be used. Other packages also exist (for instance, Matlab has an optimization toolbox which can be used).

Fifth, once the unknown $x_i$'s are found, compute the frequency response H(f) as a linear sum of the prolate spheroidal wave functions weighted by the x's. If needed, compute the inverse Fourier Transform of H(f) to obtain the impulse response of the pulse shaping filter h(t). Again, this can be done using any standard FFT or numerical integration routine.

Ψ(f) and ψ(t) are easily obtainable from H(f) and h(t). Then, depending upon the implementation of a particular transmitter, an appropriate pulse shaping apparatus can be manufactured.

Figure 5:
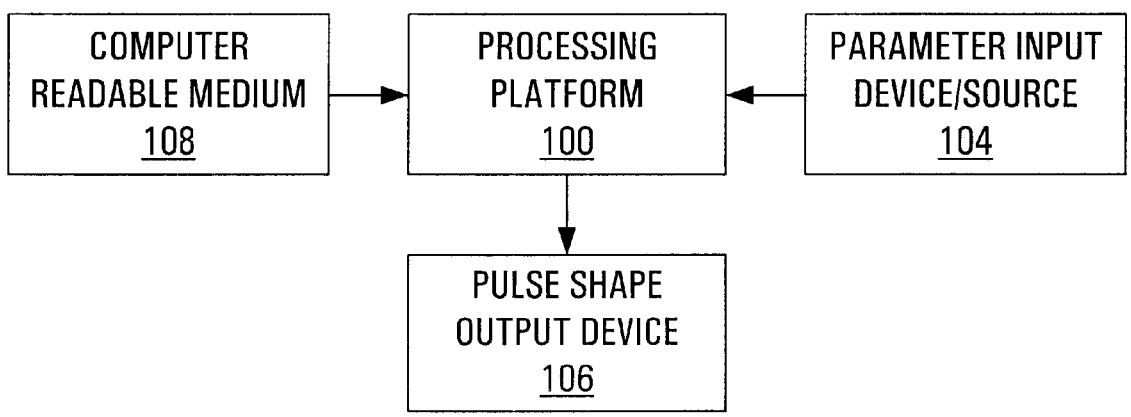
FIG. 5 is an apparatus according to an embodiment of the invention.

The above described method is implementable on an apparatus such as illustrated in FIG. 5 which shows a processing platform 100, a parameter input device or parameter source 104, and a pulse shape output device 106. The processing platform 100 may be any device or system capable of running software to perform the necessary mathematical computations as outlined above. The parameter input device or source 104 is any mechanism by which the necessary cost functions and constraint functions can be identified and parametrized. This may simply consist of a keyboard. Alternatively, the functions may be identified on a diskette, or may be permanently integrated into the software. The pulse shape output is any mechanism by which the resulting pulse shape can be presented. This may consist of some sort of display or it may be a printer, or a diskette to name a few examples. The software for running the described methods may be stored on the processing platform directly, or alternatively it may be embodied in a computer readable medium 108 such as a diskette for example.

To make a FIR filter according to an embodiment of the invention, ψ(t) is sampled at periodic discrete intervals, and the samples are used to define the response FIR filter.

Alternatively, a digital filter with frequency response Ψ(f) can be made using known techniques.

Numerous modifications and variations of the present invention are possible in light of the above teachings. It is therefore to be understood that within the scope of the appended claims, the invention may be practised otherwise than as specifically described herein.

The above described implementation has used prolate spheroidal wave functions as the basis functions. Any set of basis functions $f_i(\omega)$ with the required properties may alternatively be used. Preferably, the set is complete, orthonormal, and orthogonal over [−W,W], thus enabling the unknown Fourier transform to be expressed as a sum of terms $x_i f_i(\omega)$, where the $x_i$ are unknown coefficients. The set should preferably have the characteristic that a series expression using the basis functions can usually truncated at a reasonable number M+1 even terms, M being an integer selected to result in a sufficiently accurate approximation.

The example given has focused on QPSK. The invention could be applied to other modulation formats such as BPSK with appropriate amendment to the cost functions and constraints.

I claim:

1. A method of determining a pulse shape having a Fourier transform for use in a DS-CDMA (direct sequence code division multiple access) communication system comprising:

projecting said Fourier transform onto a truncated set of basis functions $f_i(\omega)$, thus expressing the Fourier transform as a sum of M+1 terms of the form $x_i f_i(\omega)$, where the $x_i$ are unknown coefficients, M being an integer selected to result in a sufficiently accurate approximation, ω being an angular frequency, and i being an indexing subscript;

expressing a cost function which is either an acquisition Signal to Noise Ratio (SNR) or an interference power as a function of the set of basis functions and the unknown coefficients;

expressing as a first constraint, in terms of the set of basis functions and the unknown coefficients, the remaining one of the acquisition SNR and the interference power;

solving numerically for the unknown coefficients such that the cost function is optimized and subject to the first constraint;

forming the Fourier transform by adding up the basis functions multiplied by the respective solved coefficients;

creating a pulse shaping circuit adapted to produce said pulse shape.

2. A method according to claim 1 wherein the set of basis functions is complete, orthonormal, and orthogonal over [−W,W].

3. A method according to claim 1 wherein the set of basis functions comprises prolate spheroidal wave functions.

4. A method according to claim 3 further comprising the steps of:

determining the pulse shape by calculating an inverse Fourier transform of said Fourier transform.

5. A method according to claim 1 wherein said first constraint is that the acquisition SNR is greater than a value selected to guarantee a minimum probability of detection at a maximum probability of false alarm for a given acquisition scheme.

6. A method according to claim 1 wherein the pulse shape is limited to being a full-response pulse shape, the method further comprising the step of:

expressing a quasi-constant envelope constraint as a function of the set of functions and the unknown coefficients;

wherein said step of solving numerically for the unknown coefficients is done such that the constant-envelope constraint is also satisfied.

7. A method according to claim 1 wherein the pulse shape is limited to being a full-response pulse shape, the method further comprising the step of:

expressing a phase continuity constraint as a function of the set of functions and the unknown coefficients;

wherein said step of solving numerically for the unknown coefficients is done such that the phase continuity constraint is also satisfied.

8. A method according to claim 1 wherein the pulse shape is a partial-response pulse shape, the method further comprising the step of including an ISI (inter-symbol interference) term in any expression(s) for interference power.

9. A method according to claim 2 wherein the pulse shape is a partial-response pulse shape, the method further comprising the step of:

expressing an ISI (inter-symbol interference) free constraint as a function of the set of functions and the unknown coefficients;

wherein said step of solving numerically for the unknown coefficients is done such that the ISI-free constraint is also satisfied.

10. A method according to claim 2 further comprising the step of:

expressing one or more spectral nulls constraint (s) as a function of the set of functions and the unknown coefficients;

wherein said step of solving numerically for the unknown coefficients is done such that spectral nulls constraint(s) is also satisfied.

11. A method according to claim 1 wherein said basis functions comprise prolate spheroidal wave functions.

12. A computer readable medium having software stored thereon for implementing a method according to claim 1.

13. A method according to claim 1 further comprising transmitting a pulse having the pulse shape.

14. A finite impulse response filter programmed to generate a pulse shape, the finite impulse response filter being adapted to receive an input sequence of data elements, multiply each data element of the input sequence by the pulse shape and to produce a continuous signal output, the continuous signal output comprising a sequence of pulse shapes comprising each data element multiplied by the pulse shape;

wherein the pulse shape is determined by:

projecting said Fourier transform onto a truncated set of basis functions $f_i(\omega)$, thus expressing the Fourier transform as a sum of M+1 terms of the form $x_i f_i(\omega)$, where the $x_i$ are unknown coefficients, M being an integer selected to result in a sufficiently accurate approximation, ω being an angular frequency, and i being an indexing subscript;

expressing a cost function which is either an acquisition Signal to Noise Ratio (SNR) or an interference power as a function of the set of basis functions and the unknown coefficients;

expressing as a first constraint, in terms of the set of basis functions and the unknown coefficients, the remaining one of the acquisition SNR and the interference power;

solving numerically for the unknown coefficients such that the cost function is optimized and subject to the first constraint;

forming the Fourier transform by adding up the basis functions multiplied by the respective solved coefficients.

15. A filter programmed to have a frequency response which is a function of a Fourier transform formed by adding up a truncated set of basis functions, each basis function having been multiplied by a respective coefficient, each coefficient being such that a cost function, the cost function being acquisition Signal to Noise Ratio expressed as a function of the truncated set of basis functions, is optimized subject to an interference power constraint;

the filter being further adapted to receive an input sequence of data elements, filter the input sequence of data elements to produce a continuous signal output, the continuous signal output comprising a sequence of pulse shapes comprising each data element multiplied by the pulse shape;

wherein the filter has a frequency response defined by projecting said frequency response onto a truncated set of basis functions $f_i(\omega)$, thus expressing the frequency response as a sum of M+1 terms of the form $x_i f_i(\omega)$, where the $x_i$ are unknown coefficients, M being an integer selected to result in a sufficiently accurate approximation, w being an angular frequency, and i being an indexing subscript;

expressing a cost function which is either an acquisition Signal to Noise Ratio (SNR) or an interference power as a function of the set of basis functions and the unknown coefficients;

expressing as a first constraint, in terms of the set of basis functions and the unknown coefficients, the remaining one of the acquisition SNR and the interference power;

solving numerically for the unknown coefficients such that the cost function is optimized and subject to the first constraint;

forming the frequency response by adding up the basis functions multiplied by the respective solved coefficients.

16. A CDMA transmitter comprising a finite impulse response filter having a pulse shape, the pulse shape having a Fourier Transform, wherein the Fourier Transform is determined by:

projecting said Fourier transform onto a truncated set of basis functions $f_i(\omega)$, thus expressing the Fourier transform as a sum of M+1 terms of the form $x_i f_i(\omega)$, where the $x_i$ are unknown coefficients, M being an integer selected to result in a sufficiently accurate approximation, $\omega$ being an angular frequency, and i being an indexing subscript;

expressing a cost function which is either an acquisition Signal to Noise Ratio (SNR) or an interference power as a function of the set of basis functions and the unknown coefficients;

expressing as a first constraint, in terms of the set of basis functions and the unknown coefficients, the remaining one of the acquisition SNR and the interference power;

solving numerically for the unknown coefficients such that the cost function is optimized and subject to the first constraint;

forming the Fourier transform by adding up the basis functions multiplied by the respective solved coefficients.

* * * * *

UNITED STATES PATENT AND TRADEMARK OFFICE
CERTIFICATE OF CORRECTION

PATENT NO. : 6,570,842 B1
DATED : May 27, 2003
INVENTOR(S) : Mohamed A. Landoisi It is certified that error appears in the above-identified patent and that said Letters Patent is hereby corrected as shown below:

Column 10,
Line 1, reads $\text{minimize } V_o = \sum_{k_0} \cdots \sum_{k_N} \alpha(k_0, \ldots, k_M) \prod_{m=0}^{M} x_{2m}^{k_m}$, however it should read $\text{minimize } V_o = \sum_{k_0} \cdots \sum_{\underline{k_M}} \alpha(k_0, \ldots, k_M) \prod_{m=0}^{M} x_{2m}^{k_m}$ Signed and Sealed this Second Day of December, 2003

JAMES E. ROGAN
*Director of the United States Patent and Trademark Office*